UNITED STATES PATENT OFFICE.

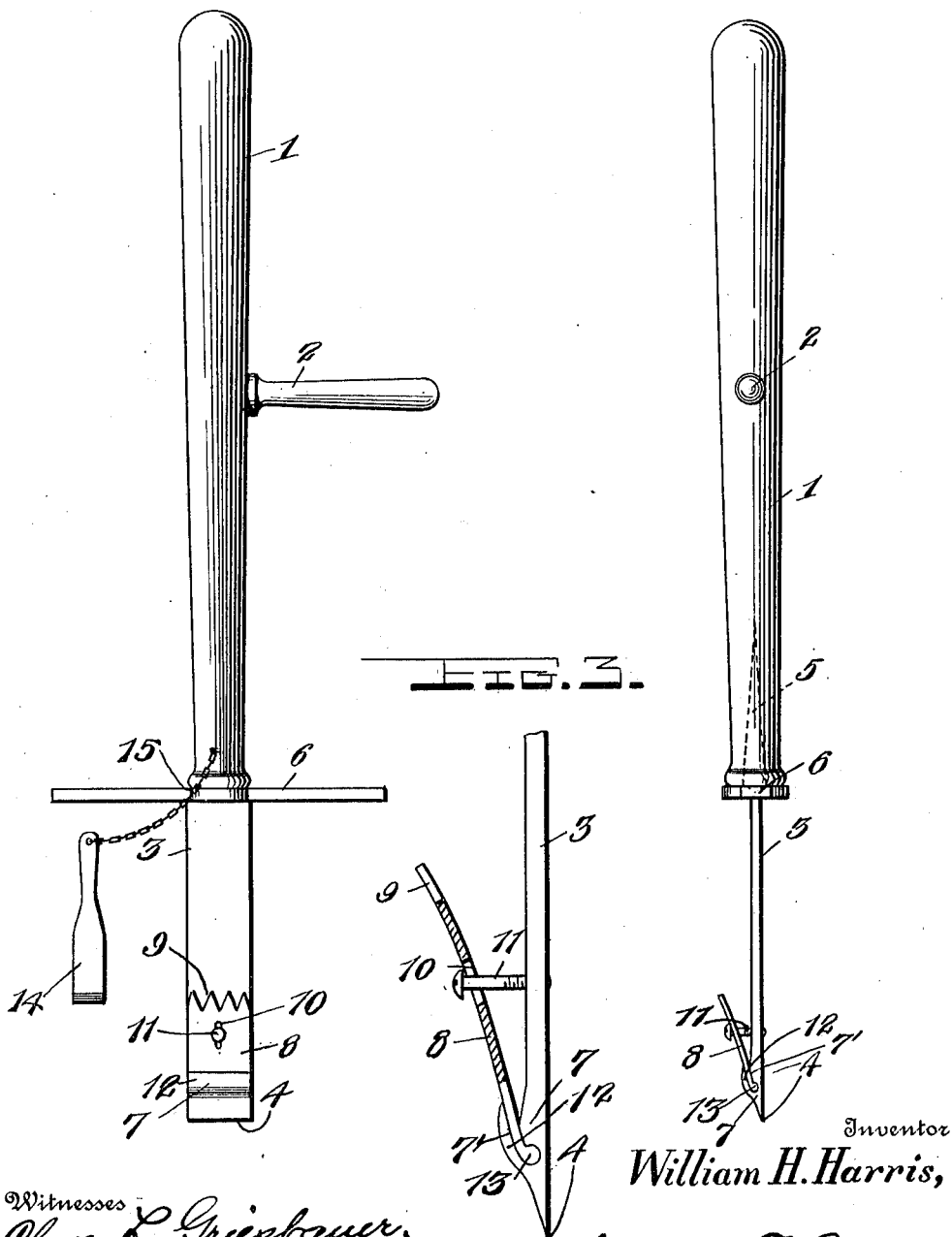

WILLIAM H. HARRIS, OF TRINIDAD, COLORADO.

WEED-PULLER.

1,020,094.  Specification of Letters Patent.  Patented Mar. 12, 1912.

Application filed June 7, 1911. Serial No. 631,764.

*To all whom it may concern:*

Be it known that I, WILLIAM H. HARRIS, a citizen of the United States, residing at Trinidad, in the county of Las Animas and State of Colorado, have invented certain new and useful Improvements in Weed-Pullers, of which the following is a specification, reference being had to the accompanying drawings.

This invention relates to weed pullers, and more particularly to pullers for removing dandelions, dock-weeds, and the like from lawns and on other places where they are not desirable.

The object of this invention is to provide a weed puller which will be particularly suitable for dandelions, dock-weeds, and similar weeds, which usually prove a source of objection to the owners of lawns and also where ground is under tillage. This puller generally is particularly suitable for this class of weeds as it is built to cut and also to pull out long roots of such plants.

Another object of this invention is to provide a puller of the class described which can be easily actuated for the insertion in the ground, or removable therefrom, and at the same time be practical and efficient in its use.

Another object of this invention is to provide in such a puller means for removing the pulling teeth from the blade easily.

Other objects of this invention will become apparent as it is more fully set forth.

It is well known to those who have practical experience with the removal of dandelions and such weeds which are very objectionable on lawns, that the only sure way of getting rid of them is to pull them up by the roots, that is, to remove the plant entirely from the lawn. There are many different solutions and chemicals on the market which are advertised to destroy such plants, but the same are by no means efficient. It seems that these solutions simply cause the upper portion or top to die down, which permit the roots to get fresher and stronger hold on the ground and then push up new leaves in more profusion than before. If the leaves are simply cut off, the same effect is produced on the plant, that is similar to the effect which is produced when a tree or the like is pruned, that is, the roots are given a stronger hold on the ground and the plant is really made sturdier, and harder to remove than in the first case.

In using the dandelion puller which is described in this application, the weed is entirely removed, and thereby prevented from disfiguring the lawn. As the puller is arranged so as to be readily cleaned from the dirt from the plant, the same can be dropped into a hole or spot where the weed has been removed and thereby fill it up, so that it will be hard to find the same spot again because of its inconspicuousness.

In the accompanying drawings which illustrate by way of example, an embodiment of this invention, Figure 1 represents a view in elevation of a weed puller embodying this invention. Fig. 2 is a side view of Fig. 1; and Fig. 3 is a detail of the lower portion of the puller showing the weed pulling parts.

Similar reference characters refer to similar parts throughout the drawings.

In the construction which is illustrated in the drawings 1 represents a long handle which has a sub or short handle 2 projecting horizontally therefrom and located about half way between the top and bottom of the handle 1. A flat blade 3 having a relatively sharp edge 4 is arranged to cut into the weed, in a manner to be described more in detail in a latter part of the specification. This blade is fastened to the handle in any suitable manner but preferably by the insertion of a projecting tongue 5 into the lower portion of the handle 1. Disposed between the lower portion of the handle 1 and the upper portion of the blade 3, is a foot rest 6 which is arranged to be used by the one operating this device, in order to push it with force into the ground, when the puller is to be used. I preferably have two arms or prongs on this foot rest 6 in order to make it more convenient. The lower portion of the blade 3 has a piece or shoulder 7 formed thereon, and to which is secured a plate 8 which has teeth 9 on the upper portion of it arranged to catch on to the roots of the weeds, and in the center portion of this plate is a hole 10 through which is loosely disposed a bolt 11 which permits this plate 8 to extend outwardly a certain amount, when it is being pulled backward, in order to permit it to fully catch on the roots of the plants it is to remove.

The shoulder 7 is provided with a slot 7′ which gives the outer portion 12 of the shoulder a lip shape, as is clearly shown in the drawings. The lower portion of this slot is enlarged in order to take the lower end 13 of the plate 8. The end of this plate and the lower portion of this slot are arranged thus, in order to permit the plate to be inserted side-wise into the blade 3. After the plate is suitably disposed in this slot, the bolt 11 is secured to the blade in the manner already described. It can be readily seen that the plate 8 can be easily removed and changed at any time, should it be desirable, at the same time, it is securely fastened in position so that it will be efficient in every way.

When the device is to be used, its sharp edge 4 is placed over the center portion of the weed to be removed, and the operator pushes down with the foot on one of the arms of the foot rest, 6 and pushes the puller down to a depth consistent with the weed and age of the weed to be pulled. Then pulling up on the handle 1 and the handle 2, he raises the puller and its teeth 9 engage with the roots of the plants and are pulled with their plate 8 outwardly to the amount which the bolt 11 permits it to extend outwardly, which thereby gives the puller a good grip on the roots of the plant and permits its easy removal. When the weed is being pulled out of the ground, it is an easy matter to remove the dandelions or the like with one's hands, and then by shaking the puller readily remove the earth, and clean the teeth 9 of the plate 8, at the same time the plate will spring back into its normal position, and the puller will be ready to be used again.

In order to arrange this device so that it can be used more easily, the lower part of the blade 3 and the piece 7 are beveled as clearly shown in the drawings, in order to offer a lesser resistance when the puller is pushed into the ground to remove the weed or the like.

This invention has many advantages but those particularly evident are, that it does its work positively and quickly, it is comparatively light, and the arrangement of its parts are such as to afford a maximum of strength with but comparatively little weight, it is efficient in every way, and it is self-cleaning which in itself is a very important characteristic as it enables the puller to be used with greater speed than would otherwise be possible.

Obviously while the construction shown in the drawings embodies but one form of this invention, it is not desired to limit this invention in any way otherwise than necessitated by the prior art as many modifications in the construction of this invention may be made without departing from the principles thereof.

In order to clean the teeth from dirt after the puller has been used, there is provided a knife or paddle 14. This paddle can be of any suitable shape and is attached to the main handle 1 by means of a chain or other flexible cord 15. By having a knife attached in this manner, the operator is saved much trouble, because this knife is always conveniently accessible and there is but small likelihood of its being lost.

Having thus described this invention it is claimed:

1. A weed puller comprising in combination a handle, a blade secured to said handle and having its lower edge relatively sharp, a shoulder disposed on said blade near said edge, a plate having a number of teeth on the upper end thereof and having its lower portion secured to said shoulder of said blade.

2. A weed puller comprising in combination a handle, a blade disposed on the lower end of said handle, and secured thereto and having its lower edge relatively sharp, a shoulder disposed on said blade adjacent to said edge, a plate having teeth on the upper end thereof and having its lower portion secured to said shoulder and said blade, a foot rest for pushing said blade into the ground, a bolt rigidly secured to said blade and arranged to restrict the outward movement of said plate.

In testimony whereof I hereunto affix my signature in the presence of two witnesses.

WILLIAM H. HARRIS.

Witnesses:
EUGENE J. M. TALBER,
J. G. JAMISON.

---

Copies of this patent may be obtained for five cents each, by addressing the "Commissioner of Patents, Washington, D. C."